US008909210B2

(12) United States Patent
Rao

(10) Patent No.: US 8,909,210 B2
(45) Date of Patent: Dec. 9, 2014

(54) MOBILE DEVICE FOR ACCESS TO AGRICULTURAL SERVICES BY NON-LITERATE AND SEMI-LITERATE USERS

(76) Inventor: Bindu Rama Rao, Laguna Niguel, CA (US)

(*) Notice: Subject to any disclaimer, the term of this patent is extended or adjusted under 35 U.S.C. 154(b) by 1503 days.

(21) Appl. No.: 12/221,876

(22) Filed: Aug. 6, 2008

(65) Prior Publication Data

US 2010/0035597 A1   Feb. 11, 2010

(51) Int. Cl.
*H04M 3/493* (2006.01)
*H04M 3/487* (2006.01)

(52) U.S. Cl.
CPC .......... *H04M 3/493* (2013.01); *H04M 3/4878* (2013.01)
USPC ............ 455/419; 455/404.1; 455/412.1; 455/420; 455/456.1; 455/552.1; 455/517; 455/422.1

(58) Field of Classification Search
CPC ... G06Q 20/223; G06Q 20/32; G06Q 20/363; H04M 3/493; H04M 2203/2044; H04M 2203/558; H04M 2203/559; H04M 1/72547; G06F 19/3418; H04L 12/185; H04L 12/588; H04L 12/5865; H04L 12/5895

USPC ............ 455/412.1, 414.1, 419, 550.1, 552.1; 705/37, 26, 1, 2, 10; 709/246, 709/217–219, 201, 203; 707/104.1
See application file for complete search history.

(56) References Cited

U.S. PATENT DOCUMENTS

| 6,591,300 | B1 * | 7/2003 | Yurkovic ....................... 709/226 |
| 6,990,459 | B2 * | 1/2006 | Schneider .................... 705/7.28 |
| 2002/0120532 | A1 * | 8/2002 | McGovern et al. ............. 705/26 |
| 2006/0036647 | A1 * | 2/2006 | Fichtner et al. ............ 707/104.1 |

\* cited by examiner

Primary Examiner — Babar Sarwar

(57) ABSTRACT

A mobile device capable of supporting applications for semi-literate farmers and agricultural industry workers. Such applications are designed to be user-friendly, primarily employ audio form to provide data and information, and promote audio based interactions. In particular, the mobile device comprises a client application that avoids/minimizes the use of keyboard, supports audio-message based interactions and data communications, supports language selection, provides intuitive icons to aid comprehension and user selection, and keeps user interaction simple. The client application comprises a labor contract module that facilitates interaction by a user (who is typically a farmer or agricultural worker) using audio messages to find and hire contract labor. The client application also comprises a social group interaction module that facilitates interaction with mobile social networks, such as groups of farmers in a region of the world, or a group of farmers growing a specific type of crop.

17 Claims, 7 Drawing Sheets

MOBILE DEVICE FOR ACCESS TO AGRICULTURAL SERVICES BY NON-LITERATE AND SEMI-LITERATE USERS

CROSS REFERENCES TO RELATED APPLICATIONS

BACKGROUND

1. Technical Field

The present invention relates generally to mobile devices; and, more particularly, to the ability to access or support agriculture services for farmers.

2. Related Art

Often, a farmer working on a farm may need to communicate with others, and employs a cell phone to talk with others. Although cell phones can be used for accessing web sites and for remotely retrieving data, farmers are often incapable of doing so for several reasons, including lack of technical skills, unfamiliarity with new applications, inability to read, etc. Current data services are not designed for use by semi-literate individuals, such as farmers in underdeveloped countries where educational levels are very low.

Similarly, when an uneducated or non-literate individual tries to access a data service on a mobile phone, not only are screens of data provided to the individual of little use to him (due to his inability to read them for example) but also navigation of typical screens on a mobile device are cumbersome and not helpful to such an individual. Thus, such individuals are unlikely to subscribe to data services and the operators are not likely to suffer lower revenues/ARPU (average revenues per user) too. When operators roll out expensive 3G and 4G data services, they need to get around this problem of making the mobile device useful to uneducated and illiterate users, but they don't seem to be able to easily surmount this problem.

Mobile devices have been used to take pictures, send pictures and receive video programs. But quite often, people who are unfamiliar with a device and are intimidated by technology are not able to take the pictures properly or to subsequently use them or transfer them.

A substantial numbers of farmers in countries such as India and China are semi-literate, and would not be able to read data provided on a mobile phone, or even interact with screens of information provided. Also, farmers in these countries are not likely to be proficient in English, and there is a need to address their needs better. However, no operator is addressing their needs adequately and new services for farmers are not being designed taking into account their illiteracy or semi-literacy. Thus in such countries, framers currently use mobile phones primarily for voice services, and they can do not consume data services.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
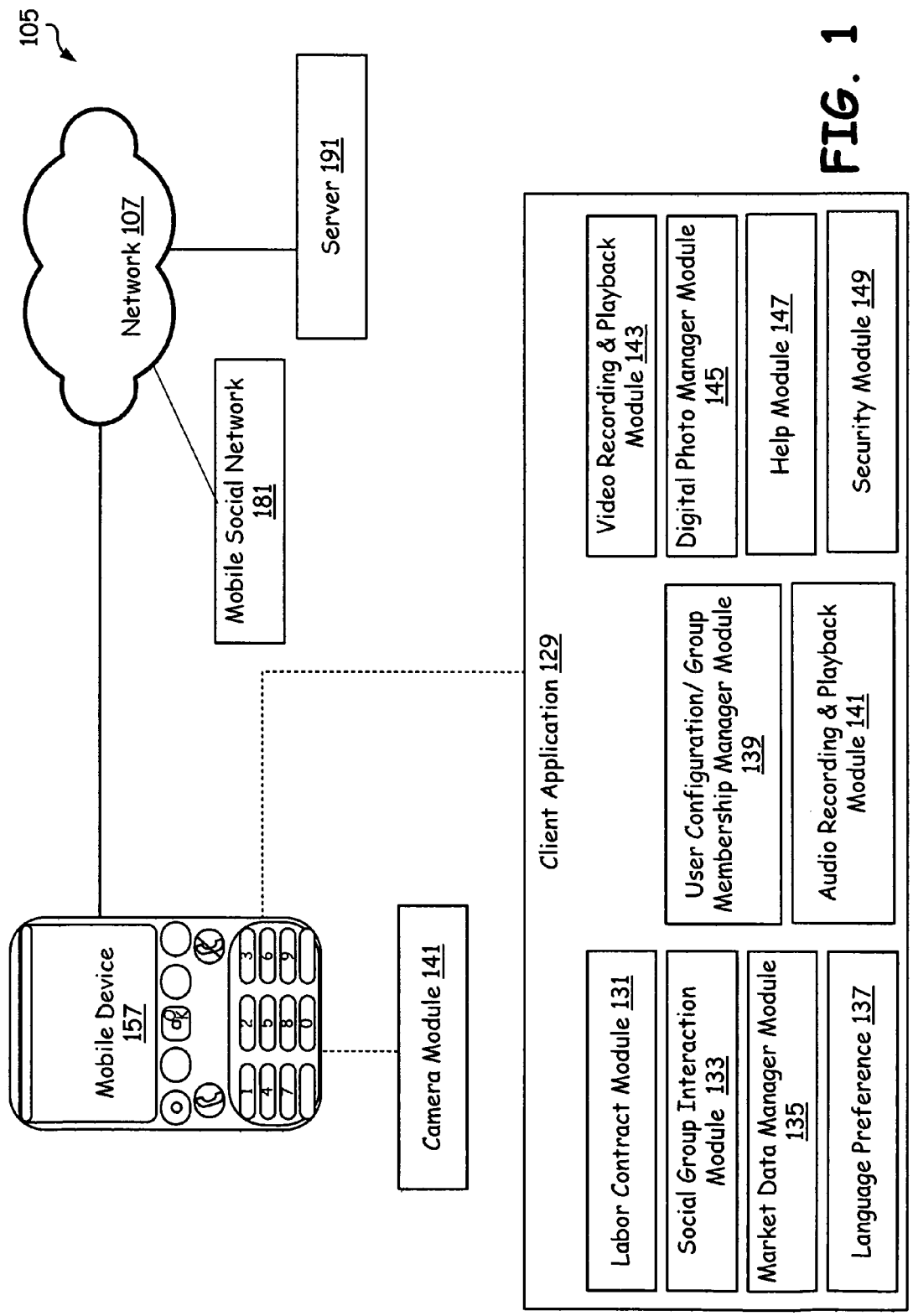
FIG. 1 is a schematic block diagram of a mobile device capable of supporting applications for semi-literate farmers and agricultural industry workers, wherein such applications are designed to be user-friendly, primarily employ audio form to provide data and information, and promote audio based interactions.

FIG. 1 is a schematic block diagram of a mobile device 157 capable of supporting applications for semi-literate farmers and agricultural industry workers, wherein such applications are designed to be user-friendly, primarily employ audio form to provide data and information, and promote audio based interactions. In particular, the mobile device 157 comprises a client application 129 that avoids/minimizes the use of keyboard, supports audio-message based interactions and data communications, supports language selection, provides intuitive icons to aid comprehension and user selection, and keeps user interaction simple.

The client application 129 comprises a labor contract module 131 that facilitates interaction by a user (who is typically a farmer or agricultural worker) using audio messages to find and hire contract labor. For example, a farmer would create an audio message (such as by recording it on the mobile device 157) on the mobile device 157. The labor contract module 131 communicates it to a social group selected by the farmer, such as a "rice growers social group" or a "rice exporters social group". Responses received are then reviewed by the farmer using the client application 129. Responses, including those in audio form, are received and any notifications received are displayed. The response received can be reviewed and a follow-up can be posted by the farmer. The farmer can select a contract labor from the responses received. The farmer can also select a contract labor and indicate his selections using radio buttons such as "interested", "not interested" and "hired" that are also provided when responses are reviewed by him. In general, responses, including those in audio form, are reviewed by the farmer one response at a time. If a contract labor is of interest to the farmer, his interest can be indicated (more offline discussions is also possible with the responder). In addition contract labor can be hired too, and an automatic message is sent back to the responder if the farmer selects the "hired" radio button provided. Other types of buttons and UI elements (such as selectable icons) are also contemplated.

The client application 129 also comprises a social group interaction module 133 that facilitates interaction with mobile social networks, such as groups of farmers in a region of the world, or a group of farmers growing a specific type of crop. For example, social groups currently subscribed to by a farmer are listed in a welcome screen provided by the client application 129. When a farmer/user selects one of them, the social group interaction module 133 facilitates further interactions with that selected social group. For example, social groups subscribed by a farmer, that show up in the list presented by the client application 129 on the mobile device 157 can be "Group: Contract Labor in Tamil Nadu", or "Group: Rice Producers in Tamil Nadu".

The social group interaction module 133 makes it possible to take digital photos and send them to the social group currently selected, i.e. to the members of the social group currently selected. In addition, an audio message describing a farmer's current farming problem, or the framers opinion about a farming technique, can be recorded and communicated too. Thus photos, audio messages and text messages, together, can be posted to the social group, and advice and comments can be sought from the members of the social group. Responses by other members of the social group can subsequently be reviewed by the farmer. Responses, from the other members of the social group are received either immediately (as they are posted) or on subsequent user initiated retrieval, based on configuration. These responses can be reviewed and a follow-up message can be posted by the farmer. A received response can be an audio-guided activity (a multi-step task) that the recipient farmer can listen to and follow. For example, a responder can send a pre-recorded audio guided activity that solves a particular problem encountered by the farmer and described in his posting.

The audio responses received can be played by the recipient farmer, another message can be recorded, a next response received can be viewed, etc. with the help of the social group interaction module 133. It is important to note that an audio follow-up responses can also be recorded and sent by the farmer as he reviews a received response (for his original posting). The audio follow-up responses can be played back after recording on the mobile device 157, or re-recorded. In addition a next response (presumably from a different member of the social group) can also be reviewed (thus proceeding to the next response in a sequence of responses available). In a related embodiment, a recorded video can be sent too, to the social group, from the mobile device 157, with the help of the social group interaction module 133.

The client application 129 also facilitates retrieval and display of market information, and such information can be, for example, displayed by commodity type and date. The client application 129 comprises a market data manager module 135 that facilitates such retrieval and display. Based on user selection, it retrieves and presents current market information, such as pricing. It can also present such information that is periodically received from a server 191 providing a remote service subscribed to by the user, or data presented to by a subscription to a social group associated with market information, that is managed by a mobile social network 181. In general, the farmer can receive and review detailed pricing information obtained from various markets. For example, detail pricing information for a particular type of crop includes a Market Center (market name), a Variety of the crop, a Minimum Price, a Maximum Price, a Modal Price and a Unit of Price. The market information can also be communicated periodically in the language preferred by the recipient farmer. For example, the server or the mobile social network 181 providing such market information takes into account a preferred language of the farmer. Language preferences and are managed by a language preference module 137. The farmer can specify a crop type, a language preferred and then receive market information for that crop type in the language preferred. Both audio information and textual information are presented in the preferred language. If such language specific information is not available, an alternate language specified by the farmer is used and data available in the alternative language is presented. A user configuration/group membership manager module 139 not only facilitates storing and management of configuration parameters but also membership information and subscription information for the various social groups that the farmer might subscribe to.

Market Information is also delivered as short bulletins, in audio form. These short bulletins are delivered as an entry in the "Your Responses" list presented to the farmer (such as in the welcome screen). The farmer can also retrieve contact information of registered exporters and dealers for a desired crop type that the farmer is interested in growing. In addition, government assistance information for farming and for agricultural practices are collected and presented when they are made available by such government entities, such as via their online websites.

A digital photo manager module 145 facilitates taking digital photos, videos, storing them locally or remotely or both, and displaying them when necessary. A video recording & playback module 143 facilitates recording of video data kin the mobile device 157 and playback of video data received from the mobile social network 181 or from other sources. A help module 147 facilitates usage help by providing help information in textual form, in audio form, in displaying videos of help information, etc. Such help information may be locally stored and available in the mobile device 157 or remotely available at the server 191 or the mobile social network 181. A security module 149 makes it possible to authenticate the user to one or more mobile social networks 181 and servers 191 and receive access to services, messages, data, etc. The security module 149 also facilitates establishing secure communications (such as SSL, TLS etc.) with other mobile devices or with the mobile social networks 181 and servers 191, as necessary.

A camera module 141 that is external to the mobile device 157 or integrated with it (in some embodiments) is used by the user to take digital photos and videos that are stored locally, or communicated to others via the mobile social networks 181 and servers 191.

In general, the mobile device 157 is communicatively coupled to the server 191 and the mobile social network 181. It comprises at least one non-volatile memory having stored therein one or both of firmware and software. The processor of the mobile device, during operation, presents a labor contracting screen that a user can employ to post a wanted posting soliciting offers from others willing to work as contract labor. The processor retrieves postings from the server 191 for a selected social group based on the user selection from the list of social groups currently subscribed to by the user. It also enables user responses to the postings that are communicated. Each of the user responses to the postings includes at least one of an audio response recorded by the user on the mobile device, a textual response entered by the user using a keyboard on the mobile device and a video response recorded by the user using a camera module 141 associated with the mobile device.

The mobile device 157 is used by a user, such as a farmer or agricultural worker, to post a wanted posting that will help him hire new contract workers when needed. The posting comprises at least one of an audio message recorded by the user on the mobile device 157, a textual message entered by the user using a keyboard on the mobile device 157 and a video message recorded by the user using a camera associated with the mobile device 157.

A labor contracting screen is presented to the user when the user selects a social group associated with contract labor from a list of social groups and other types of data presented to the user, such as in a welcome screen. The user can send a posting to that social group describing the kind of contract labor that he needs, the duration needed, etc. The mobile device 157 subsequently receives responses, and displays a contract offer received from an interested responder in response to the wanted posting soliciting offers from contract labor. The user's interest level in the displayed contract offer is also solicited and the user can provide an "interest level" by selecting one of the radio buttons presented (for example). The mobile device 157 communicates the user's interest level to the interested responder. During the review of responses received to a wanted posting sent by the user, an interest level, such as one of "Interested", "Not Interested" and "Hired", can be selected.

The mobile device 157 provides a market information to a user, periodically retrieving it, or receiving it when pushed by the server 191 (or the mobile social network 181). The market information comprises at least one of a current market price for a crop type, an audio bulletin of market information, an exporters list, and a local dealer list.

In one embodiment, the mobile device 157 is communicatively coupled to a mobile social network 181 and it enables registration, if necessary, with any of a set of social groups managed by the mobile social network 181. The mobile device 157 presents a list of social groups currently subscribed to by the user, for the user to select a selected social group from. It retrieves postings from the mobile social network 181 for the selected social group based on the user selection from the list of social groups. It enables new user postings to the selected social group, wherein such new user postings comprise at least one of an audio message, a textual message, a digital photo and a video message. The set of social groups managed by the mobile social network 181 comprises those that address the needs and issues of farmers and agricultural workers. The user of the mobile device 157 is automatically provided a subscription to those of the set of social groups that are associated with a profile of the user. The profile of the user comprises at least one crop type grown by the user, at least one geographical location associated with the user, and at least one preferred language.

The set of social groups managed by the mobile social network comprises a social group for contract labor, a social group for growers of a specific crop type, a social group of farmers and agricultural workers associated with a specific geographical region and a social group for commodity market information. The mobile device 157 enables posting of an audio wanted post to the social group for contract labor inviting responses from individuals willing to provide contract labor. It facilitates review of the responses from these individuals. The user can review them one at a time. The mobile device 157 solicits a feedback from the user. It receives the feedback provided by the user. It communicates the feedback provided by the user to individuals (responders) who sent responses.

The mobile device accesses the profile of the user and facilitates periodically retrieving market information about commodities based on the profile of the user. It then presents the retrieved market information to the user.

The client application 129 of mobile device 157 interacts with a server 191 (or the mobile social network 181). The client application maintains and manages a profile of the user that comprises a preferred language, crops grown and farming region. The client application 129 retrieves and presents a market information for the user from the server 191 based on the profile. The client application 129 also comprises a subscription information to a social group for a user of the mobile device 157. It retrieves and presents postings from the social group from the server 191 based on at least one of the profile and the subscription information. It facilitates posting of a message by the user to the social group, wherein the posting is one of an audio message, a video message, a textual message, or a combination of these. The social group is one of a set of social groups dedicated to farming and agricultural issues. The subscription information is one of a free subscription, a paid subscription, a trial subscription, etc.

The client application facilitates posting of a wanted message to a social group available via the server 191 or the mobile social network 181. It retrieves responses received to the wanted message posted. It presents the responses received to the user for perusal and selection of at least one of the responses. The user can respond back with a follow-up message, if necessary.

The client application 129 comprises a labor contract module 131 that enables creating a wanted posting for contract labor, communicating the wanted posting to a social group via the server, receiving responses to the wanted posting from one or more responders, and selection of contract labor based on the responses received. The client application determines vendors in the farming region capable of selling the crops grown by the user. It also facilitates interactions by the user with the vendors, In one embodiment, interactions by the user with the vendors comprise communication of a sell offer by the user to the vendor, communication of a buy offer by the vendor to the user in response to the sell offer, and confirmation of the sell offer by the user to the vendor.

Figure 2:
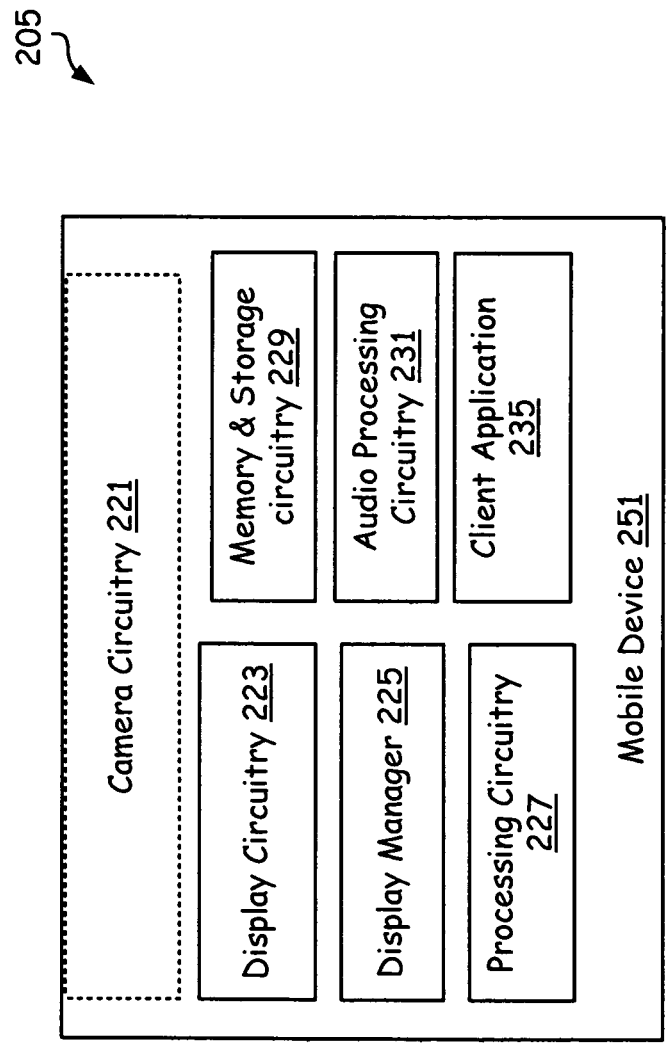
FIG. 2 is a schematic block diagram of a mobile device that supports applications for semi-literate farmers and agricultural industry workers, wherein a client application 235 provides user-friendly access to data and services to farmers.

FIG. 2 is a schematic block diagram of a mobile device 251 that supports applications for semi-literate farmers and agricultural industry workers, wherein a client application 235 provides user-friendly access to data and services to farmers. The client application 235 comprises all the functionality and modules described for the client application 129 of FIG. 1. It primarily employs the audio form to provide data and information to farmers and promotes audio based interactions by the farmers.

The mobile device 251 comprises a processing circuitry 227, a display circuitry 223, a display manager 225, a memory and storage circuitry 229, an audio processing circuitry 231 and the client application 235. It also comprises an optional camera circuitry 221 that is capable of taking digital pictures, videos, etc. that can be stored or communicated to others.

Figure 3:
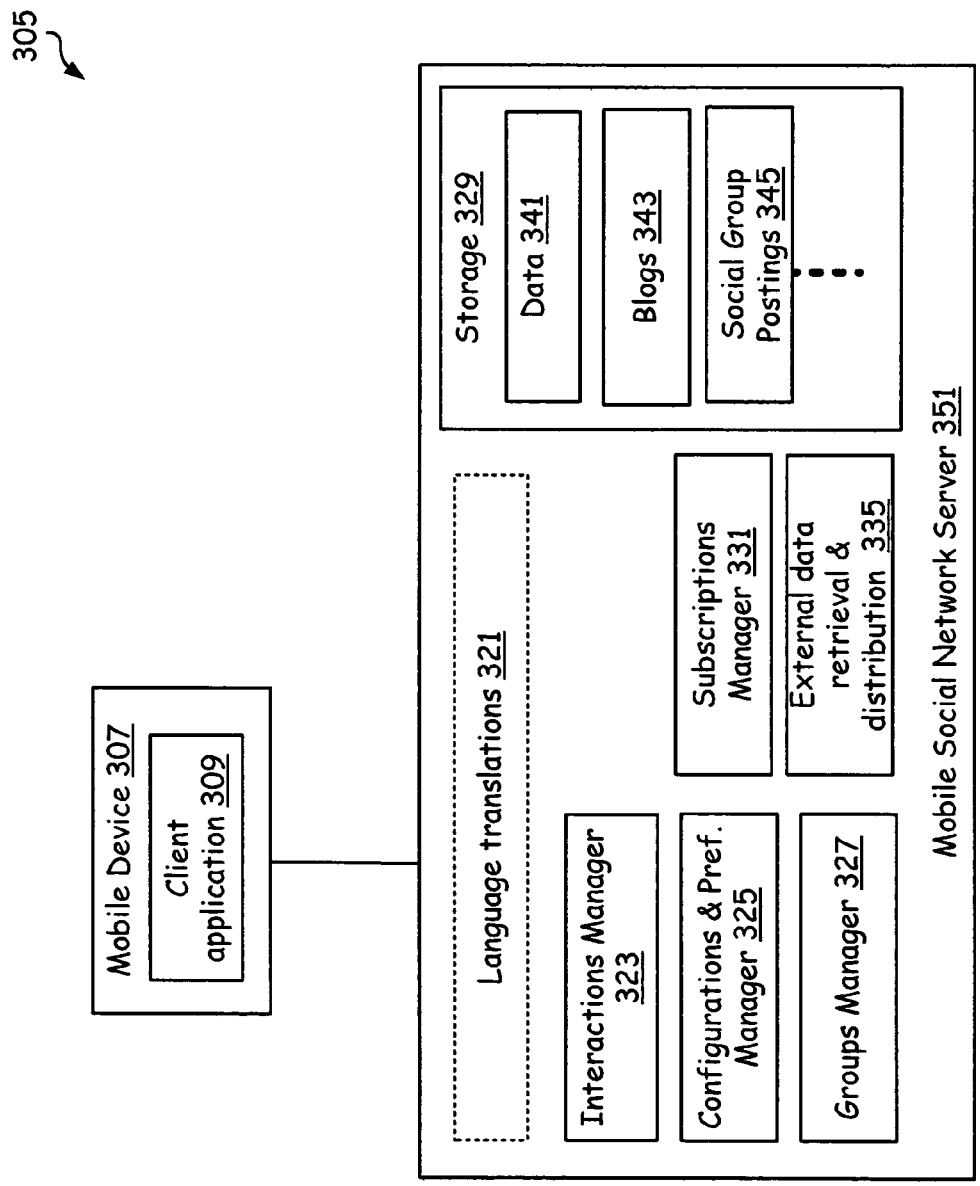
FIG. 3 is a schematic block diagram of a mobile network that supports mobile applications for semi-literate farmers and agricultural industry workers, wherein a mobile social network server provides data and services to farmers using a mobile device, wherein a client application in the mobile device provides access to the mobile social network server.

FIG. 3 is a schematic block diagram of a mobile network 305 that supports mobile applications for semi-literate farmers and agricultural industry workers, wherein a mobile social network server 351 provides data and services to farmers using a mobile device 307, wherein a client application 309 in the mobile device 307 provides access to the mobile social network server 351. The client provides a farmer/agricultural worker user-friendly access to data and services that are provided by the mobile social network server 351. The farmer/agricultural worker can interact with other farmers/agricultural workers using the mobile device 307. He can send queries, receive advices, get market information such as pricing, locate and hire contract workers, etc. The farmer/agricultural worker interacts with and uses services provided by the mobile social network server 351. Such services include contacting and hiring contract labor, seeking advice by other farmers/agricultural workers by participating in social groups, etc.

The mobile social network server 351 comprises a groups manager 327 that facilitates managing groups of users, starting new groups, etc. It comprises a subscriptions manager 331 that facilitates subscription by individuals who want to become members of specific groups and participate in those groups, receive posts, interact with other members, etc. It also comprises a configuration & preferences manager 325 that manages user configurations such as various groups subscribed to by user, the delivery schedule and frequency/time for push messages and data, the device specific parameters, security configurations, etc. The mobile social network server 351 also comprises an interactions manager 323 that makes it possible for a user to interact with, send messages/posts to and receive messages/posts from other members, in the various social groups supported, and a storage 329 that is used to store data 341, blogs 343 and social group postings 345.

The farmer using the mobile device 307 can join an existing social group, such as a group for "rice growers in Texas". The farmer can then send posts, receive posts from others, send questions, receive response, etc. The post can be in audio form, textual form, video form or a combination of these. Similarly, responses received for those posts can be in audio form, textual form, video form or a combination of these.

Figure 4:
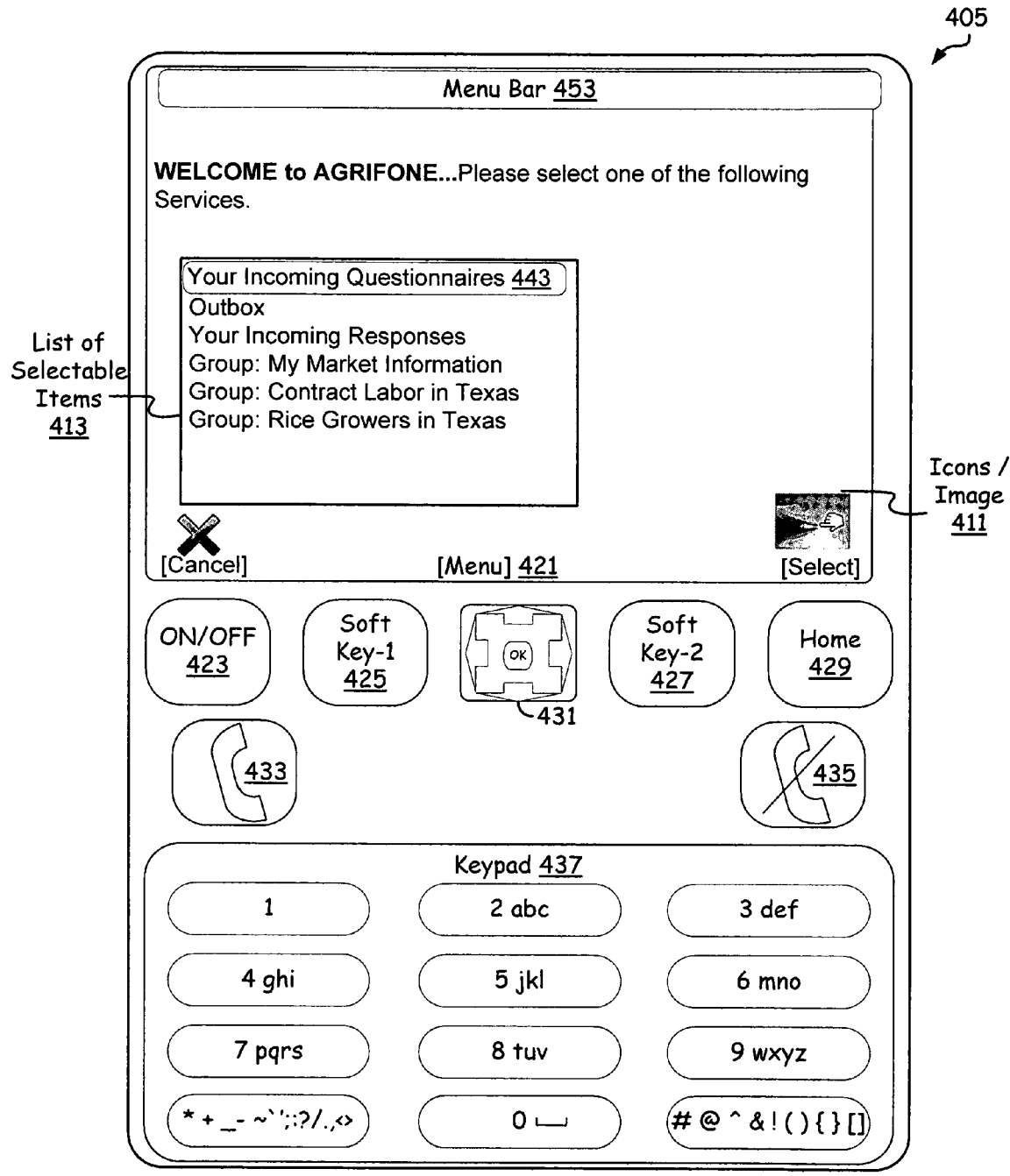
FIG. 4 is a schematic block diagram of a mobile device that supports access to farmer/agricultural worker services and social interactions via a client application available in the mobile device.

FIG. 4 is a schematic block diagram of a mobile device 405 that supports access to farmer/agricultural worker services and social interactions via a client application available in the mobile device 405. The client application provides a welcome screen to the user that provides a list of services that the user can invoke, such as incoming questionnaires, 443, an outbox, incoming responses, and posting from social groups subscribed to by the user, each social group being represented by an entry in the list of services. Thus, a list of selectable items 413 is presented in the welcome screen and the user can select one of them using soft keys/buttons such as the Select button, the Menu button, and the Cancel button. Appropriate icons/images/graphics 411 are provided and displayed next to these buttons to aid comprehension by those who do not read and by those with poor reading skills. By using just the joystick 431, a user can browse through the list of services and select one of them, which brings up subsequent screens associated with the corresponding service.

From the list of selectable items 413, a user can select either a set of incoming questionnaires, messages sent to others that are stored in an outbox, responses received for questionnaires sent or messages posted to social groups, postings from groups that provide customized market information, such as those for a particular type of crop, postings from groups dedicated to contract labor (wanted advertisements, information requests, etc.) and groups dedicated to growing particular crop types. For example, based on a user profile comprising crops grown by the user, the geographical location of the farms, etc., the membership to these groups are automatically provided. Once an item is selected from this list, a corresponding module, such as a labor contract module is invoked, that provides additional information/data screens and user interaction facilities.

Softkeys 425, 427 provide access to functionality that can be invoked, such as cancel and list selections. In addition, icons/images/graphics 411 make it possible to provide adequate information to semi-literate users who cannot read textual information presented.

Figure 5:
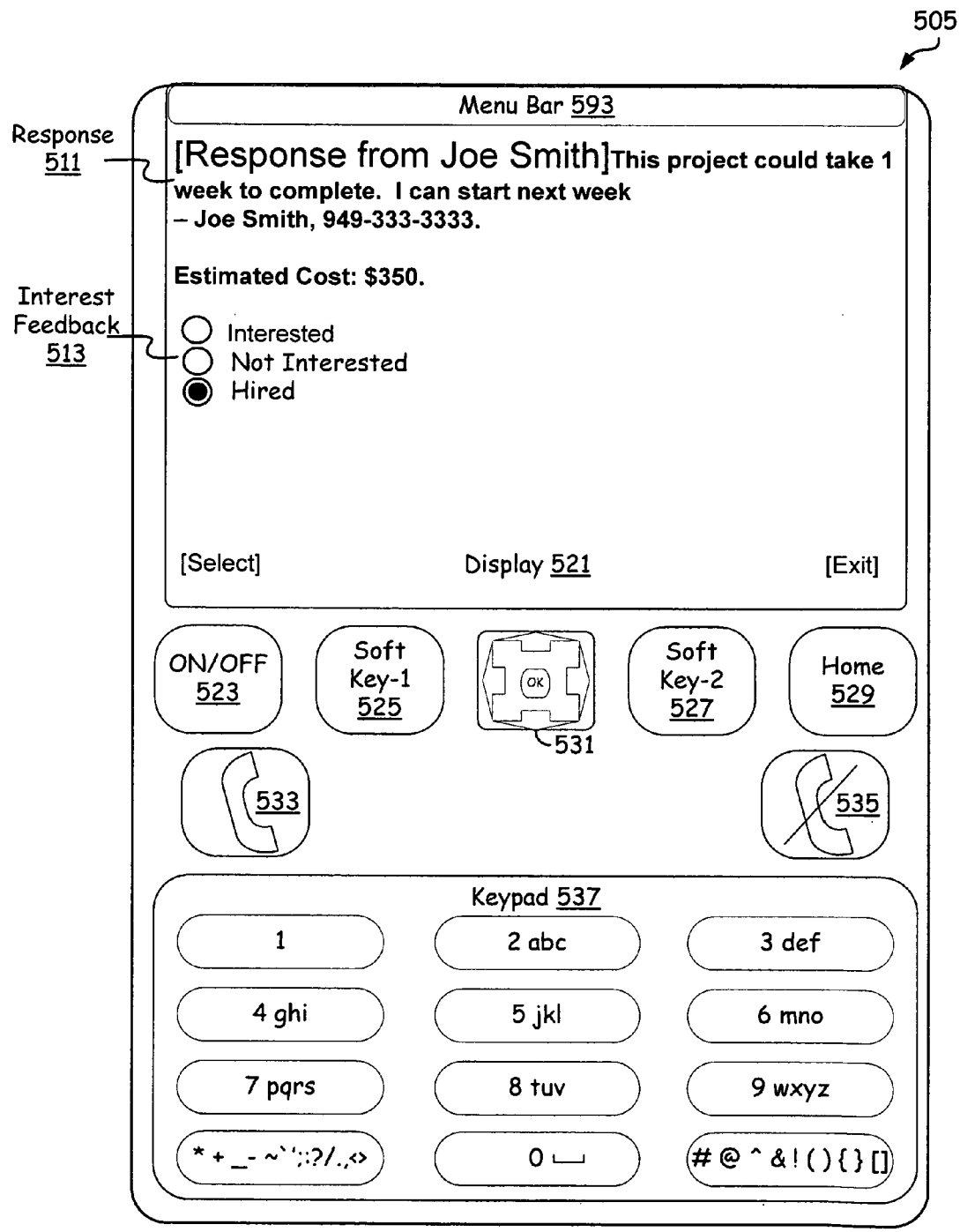
FIG. 5 is a schematic block diagram of a mobile device that supports services aimed at farmer/agricultural workers, such as a labor contracting service, built in accordance with the present invention.

FIG. 5 is a schematic block diagram of a mobile device 505 that supports services aimed at farmer/agricultural workers, such as a labor contracting service, built in accordance with the present invention. The mobile device 505 comprises a client application capable of displaying screens and data for the labor contracting service, employing the display 521. In particular, responses 511 received from one or more contract agricultural workers in response to a "wanted" request/advertisement posted by a user are displayed along with a cost estimate provided by the responder. The response may comprise an estimated labor cost or a rate at which labor can be hired. The responder may also provide an audio response that the user can playback/review. The client application, employing a labor contract module 131, presents an interest feedback section 513 to the user, that the user can use to indicate if the user is "interested" in the response from the responder, not interested in the response from the responder, intends the hire the responder, etc. Employing the joystick 531 and the softkeys 525, 527, the user can review the response, select an interest feedback, and communicate with the responder. The use of a keypad 537, although useful, is not often needed for most user interactions solicited by the client application of the mobile device 505. In one embodiment, the labor contract module 131 also provides a calendar display functionality that is used by the user to set a schedule in the calendar of the mobile device 505.

Figure 6:
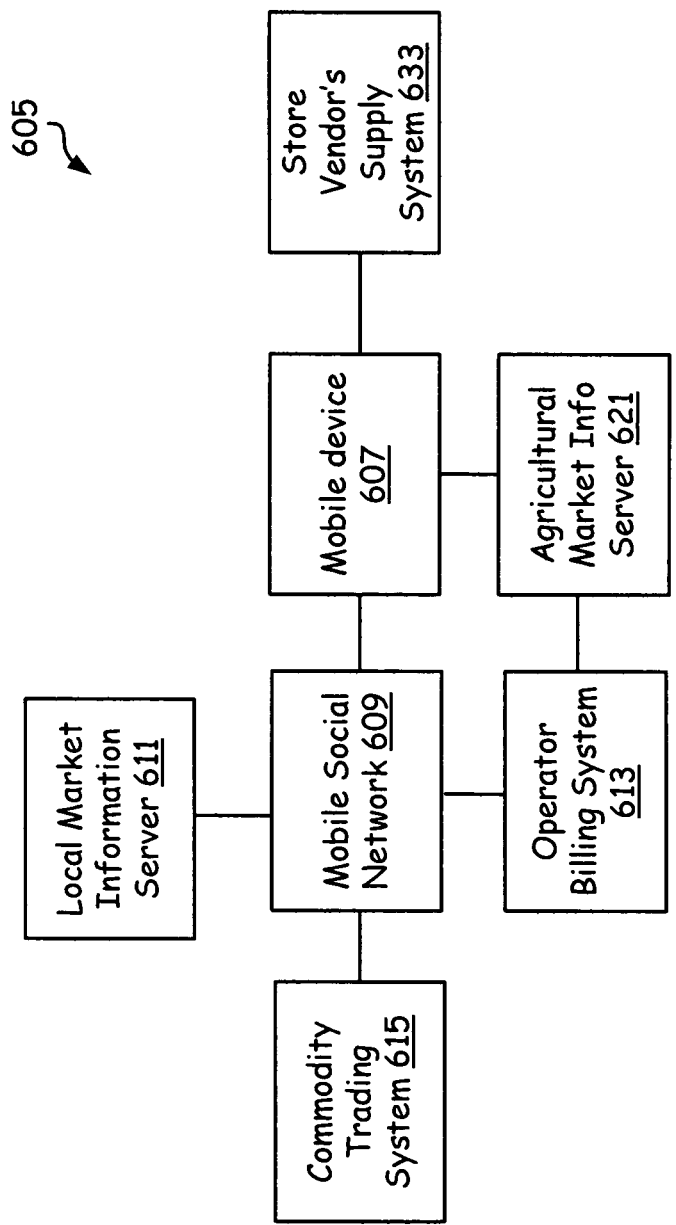
FIG. 6 is a perspective block diagram of a network wherein a mobile device 607 provides access to a mobile social network, to a store vendor's supply system and to an agricultural market information server.

FIG. 6 is a perspective block diagram of a network wherein a mobile device 607 provides access to a mobile social network 609, to a store vendor's supply system 633 and to an agricultural market information server 621. Via the mobile social network 609, the mobile device gains access to data and information provided by a local market information server 611, a commodity trading system 615 and an operator billing system 613.

The store vendor's supply system 633 facilitates determination of current demand for a commodity/crop being produced by the user (farmer or agricultural worker) that the store vendor can market. The mobile device 607 is able to provide the user not only information on how much of his crop may be sold to the store vendor but also provide a communication means to make an offer to sell his product and receive confirmation of its purchase by the store vendor.

The commodity trading system 615 provides data on various commodities, the demand for those commodities, the futures prices for the commodity, etc. that a user of the mobile device 607 can retrieve by subscribing to appropriate social groups provided by the mobile social network 609. The agricultural market information server 621 provides current prices at various markets in the region and other nearby regions, the expected dates of arrival of new crop in those various markets in the regions, and the amount of crops that will be delivered to those markets. The local market information server 611 provides details of what commodities are currently available in the local markets and the commodities that are currently in short supply. They also provide contact information of various dealers for those commodities at the local markets.

Figure 7:
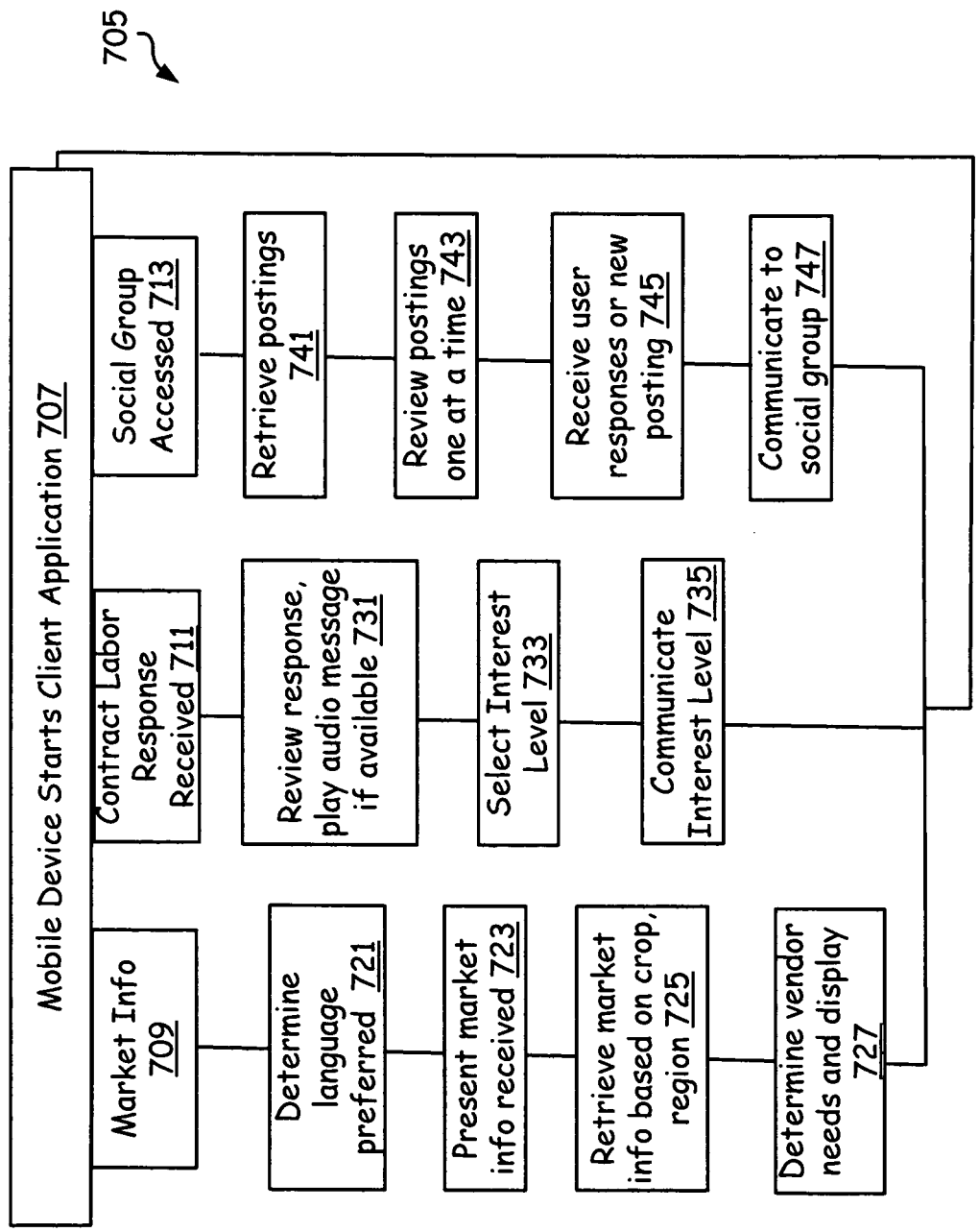
FIG. 7 is a flow chart of exemplary operation of the client application of the mobile device, built in accordance with the present invention.

FIG. 7 is a flow chart of exemplary operation of the client application of the mobile device, built in accordance with the present invention. The processing starts at a block 707 when the mobile device starts the client application that is capable of retrieving and presenting a market information, facilitating labor contract hiring and interactions with social groups. The client application monitors events and responds to such events by invoking appropriate modules and executing appropriate functionality.

When the client application encounters a market information 709 event, it invokes a market information module and facilitates retrieval of market information and its display based upon language preferences, crop type being grown and regions of interest of a user (such as a farmer or agricultural worker). At a next block 721, the client application determines the user's preferred language. This information is used to retrieve and present market information in the preferred language, if available. It is also used to remotely translate market information, if necessary, before it is presented to the user. At a next block 723, the market information is that is received from a remote server or a social group from a mobile social network, often in a pushed-mode, is presented to the user. For example, the user may periodically received market information that the user has subscribed to, and the client application supports download and display of such pushed information.

Then, at a next block 725, the client application retrieves other market information based on crop types grown by the user (crops of interest) and based on regions where such crops are being grown (regions of interest). Other parameters may be employed for such retrieval, such as season, market demand, commodity prices, etc. Then, at a next block 727, the client application determines the commodity needs of various vendors and presents them to the user. For example, the client application interacts with external store vendor systems to determine their needs and expected delivery dates, etc. and presents them to the user, such as by commodity type and regional trends. The user can optionally interact with such external store vendor systems to provide a proposed commodity price, volume and proposed delivery dates. Thus, a direct access to market is facilitated by the client application. Processing then continues at the next block 707 where the client application awaits new events.

When the client application encounters a contract labor response received event 711, it invokes a labor contract module and facilitates retrieval of received responses to a previous "wanted" posting by the user, and displays it. At a next block 731, the client application determines the availability of audio response message from a responder and makes it possible for the user to play it. Similarly, a video response message, if available can be played by user. After reviewing the messages, the user is provided an opportunity to provide a interest indication, to show an interest level. This is accomplished by, for example, soliciting the user's input to a set of radio buttons, wherein the radio buttons provides choices such as "Interested", Not Interested", "Hired", etc. In addition, the user can provide an audio feedback too, by recording a voice message on the mobile device using the client application. Then, at a next block 735, the interest level information and any feedback message provided by the user is communicated to the responder (of the current response that is being reviewed). Processing then continues at the next block 707 where the client application awaits new events.

When the client application encounters a social group accessed event 713, it invokes a social group interaction module and determines the various social groups the user has subscribed to. At a next block 741, it facilitates retrieval of new postings, received responses to previous posts, etc. Then, at a next block 743, the client application retrieves one posting at a time and presents it to the user. It also determines the availability of audio messages or video postings/messages from a responder and makes it possible for the user to play it.

At a next block 745, the client application receives the user's response to the current posting (being reviewed), in textual, audio, video or a combination thereof. It is also capable of receiving a new posting from the user for the current (selected currently) social group. Then, at a next block 747, it communicates the new posting or a response/feedback provided by the user to an existing posting, to the server associated with the social group. Processing then continues at the next block 707 where the client application awaits new events.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A mobile device communicatively coupled to a server, the mobile device comprising:
   at least one non-volatile memory having stored therein one or both of firmware and software;
   at least one processor operably coupled to the non-volatile memory, wherein the at least one processor, during operation, at least:
   manages a profile of a user of the mobile device, the profile of the user comprising information identifying at least one type of crop grown by the user, at least one geographical region in which the user farms, and at least one preferred language of the user;
   receives, automatic membership to social groups based on the profile of the user comprising the crops grown by the user and the geographical region;
   provides the user opportunities to explicitly subscribe to social groups;
   displays a list of the social groups, wherein the list of the social groups comprises the social groups selected for the user based on at least one of the profile of the user and the explicit subscription of the user;
   receives, from the user, input identifying a social group selected from the list of the social groups and in response retrieves and presents to the user, postings from the server by members of the selected social group;
   enables the user responses to the presented postings and communicates them to the server;
   presents a labor contracting screen that enables the user to post, to the selected social group, a wanted posting soliciting labor rates and offers to work as contract labor;
   wherein the list of the social groups comprises addressing the needs and issues of farmers and agricultural workers, the social groups for contract labor, the social groups for growers of a specific crop type and the social groups for commodity market information.

2. The mobile device of claim 1, wherein each of the user responses to the postings comprises at least one of the following:
   an audio response recorded by the user on the mobile device;
   a textual response entered by the user using a keyboard on the mobile device; and
   a video response recorded by the user using a camera associated with the mobile device.

3. The mobile device of claim 1, wherein the wanted posting comprises at least one of the following:
   an audio message recorded by the user on the mobile device;
   a textual message entered by the user using a keyboard on the mobile device; and
   a video message recorded by the user using a camera associated with the mobile device.

4. The mobile device of claim 1, wherein the at least one processor, during operation, further at least:
   displays a contract offer received from an interested responder in response to the wanted posting soliciting offers;
   solicits user selection of one of a plurality of interest levels in the displayed contract offer; and
   communicates the selected user interest level to the interested responder.

5. The mobile device of claim 4, wherein the plurality of user interest levels comprise representations that the user is interested in the responder, that the user is not interested in the responder, and that the responder is hired by the user.

6. The mobile device of claim 1, wherein the at least one processor, during operation, further at least:
   provides market information comprising at least one of a current market price for a crop type, an audio bulletin of market information, an exporters list, and a local dealer list.

7. The mobile device of claim 1, wherein each social group comprises one of farmers of a particular type of crop, farmers in a particular geographical farming region, contract laborers in a particular geographical region; or exporters of a particular type of crop.

8. A mobile device communicatively coupled to a mobile social network, the mobile device comprising:
   at least one non-volatile memory having stored therein one or both of firmware and software;
   at least one processor operably coupled to the non-volatile memory, wherein the at least one processor, during operation, at least:
   manages a profile of a user of the mobile device, the profile of the user comprising information identifying at least one product of the user, at least one geographical region in which the user produces the product, and at least one preferred language of the user;
   receives, automatic membership to social groups based on the profile of the user and the geographical region;
   provides the user opportunities to explicitly subscribe to the social groups;
     presents a list of the social groups from a set of the social groups related to the product of the user, wherein the list of the social groups comprises the social groups selected based on at least one of the profile of the user and the explicit subscription of the user;
   retrieves postings from the mobile social network for a social group selected by the user from the list of the social groups;
   enables new user postings to the selected social group, wherein the new user postings comprise at least one of an audio message, a textual message, a digital photo and a video message;
   wherein the list of the social groups comprises addressing the needs and issues of farmers and agricultural workers, the social groups for contract labor, the social groups for growers of a specific crop type and the social groups for commodity market information; and
   wherein the profile of the user comprises at least one crop type grown by the user, the at least one geographical region in which the user farms, and the at least one preferred language of the user.

9. The mobile device of claim 8, wherein the at least one processor, during operation, further at least:
   enables posting of an audio wanted post to the social group for contract labor inviting responses from individuals willing to provide contract labor;
   facilitates review of the responses from the individuals by the user and solicits a feedback from the user;
   receives the feedback provided by the user to at least one of the individuals; and
   communicates the feedback provided by the user to the at least one of the individuals.

10. The mobile device of claim 8, wherein the at least one processor, during operation, further at least:
- accesses the profile of the user;
- facilitates periodically retrieving market information about commodities based on the profile of the user; and
- presents the retrieved market information to the user.

11. A client application for a mobile device that interacts with a server, the client application comprising:
- a profile of a user of the mobile device, the profile comprising information identifying at least one preferred language of the user, at least one crop grown by the user, and at least one geographic region in which the user farms;
- the client application receives automatic membership to social groups for the user based on the profile of the user;
- the client application facilitating explicit subscription to the social groups;

the client application listing the social groups on the mobile device for the user, based on the user profile and the explicit subscription of the user;

the client application periodically retrieving and presenting market information to the user from the server based on the user profile, in the language preferred by the user, wherein the market information is provided as audio information, video information as well as textual information in the preferred language;
- wherein the list of the social groups comprises addressing the needs and issues of farmers and agricultural workers, the social groups for contract labor, the social groups for growers of a specific crop type and the social groups for commodity market information.

12. The client application of claim 11, further comprising:
- subscription information to at least one social group for the user of the mobile device, wherein the at least one social group comprises at least one social group selected for the user based on the profile;
- the client application retrieving and presenting postings from the at least one social group from the server based on at least one of the profile and the subscription information; and
- the client application facilitating posting of a message by the user to the at least one social group, wherein the posting is one of an audio message, a video message, a textual message, or a combination of these.

13. The client application of claim 12, wherein the at least one social group is one of a set of social groups dedicated to farming and agricultural issues, and wherein the subscription information is one of a free subscription, a paid subscription or a trial subscription.

14. The client application of claim 11, further comprising:
- the client application facilitating posting of a wanted message to a social group available via the server;
- the client application retrieving responses to the wanted message; and
- the client application presenting the responses to the user for perusal and selection of at least one of the responses.

15. The client application of claim 11, further comprising:
- a labor contract module that enables creating a wanted posting for contract labor, communicating the wanted posting to a social group via the server, receiving responses to the wanted posting from one or more responders, and selecting contract labor based on the responses received.

16. The client application of claim 11, further comprising:
- the client application determining vendors in the at least one geographic region in which the user farms capable of selling the crops grown by the user; and
- the client application facilitating interactions by the user with the vendors.

17. The client application of claim 16, wherein interactions by the user with the vendors comprise communication of a sell offer by the user to the vendor, communication of a buy offer by the vendor to the user in response to the sell offer, and confirmation of the sell offer by the user to the vendor.

* * * * *